United States Patent [19]

Self

[11] Patent Number: 4,889,464

[45] Date of Patent: Dec. 26, 1989

[54] MOVABLE TIPPING FRAME FOR HOIST TRUCKS

[75] Inventor: F. Wayne Self, North Little Rock, Ark.

[73] Assignee: Translift Systems, Inc., Conway, Ark.

[21] Appl. No.: 262,323

[22] Filed: Oct. 25, 1988

[51] Int. Cl.⁴ ............................................. B60P 1/04
[52] U.S. Cl. .................................. 414/491; 414/499; 298/14
[58] Field of Search ............... 298/17.5, 17.7, 12, 298/14, 16; 414/498, 499, 500, 469, 477, 478, 479, 480, 491, 492, 493, 494, 921, 728, 742, 542

[56] References Cited

U.S. PATENT DOCUMENTS

| | | | |
|---|---|---|---|
| 3,022,111 | 2/1962 | Hutchinson | 298/14 |
| 3,695,709 | 10/1972 | Reinhardt | 298/14 X |
| 4,153,169 | 5/1979 | Cipkowski | 414/498 X |
| 4,755,097 | 7/1988 | Corompt | 414/499 |
| 4,778,327 | 10/1988 | Tufenkian et al. | 414/477 X |

FOREIGN PATENT DOCUMENTS

| | | | |
|---|---|---|---|
| 174293 | 8/1952 | Austria | 298/14 |
| 1150121 | 4/1985 | U.S.S.R. | 414/498 |
| 2000107 | 1/1979 | United Kingdom | 414/500 |

Primary Examiner—Frank E. Werner
Attorney, Agent, or Firm—Alan Ruderman

[57] ABSTRACT

A hoist vehicle of the semi-trailer type has a slide frame on which a tipping frame is pivotably mounted. The slide frame is adjustably movable between forward and rearward positions relative to the bed of the vehicle to locate the load carried by the tipping frame at positions where the weight bearing on the axles of the vehicle is optimized so that greater payloads may be carried without exceeding government imposed maximum axle loadings. A chain is trained about sprockets and connected to the slide frame to accurately adjust the position of the slide frame and the center of gravity of the payload.

7 Claims, 2 Drawing Sheets

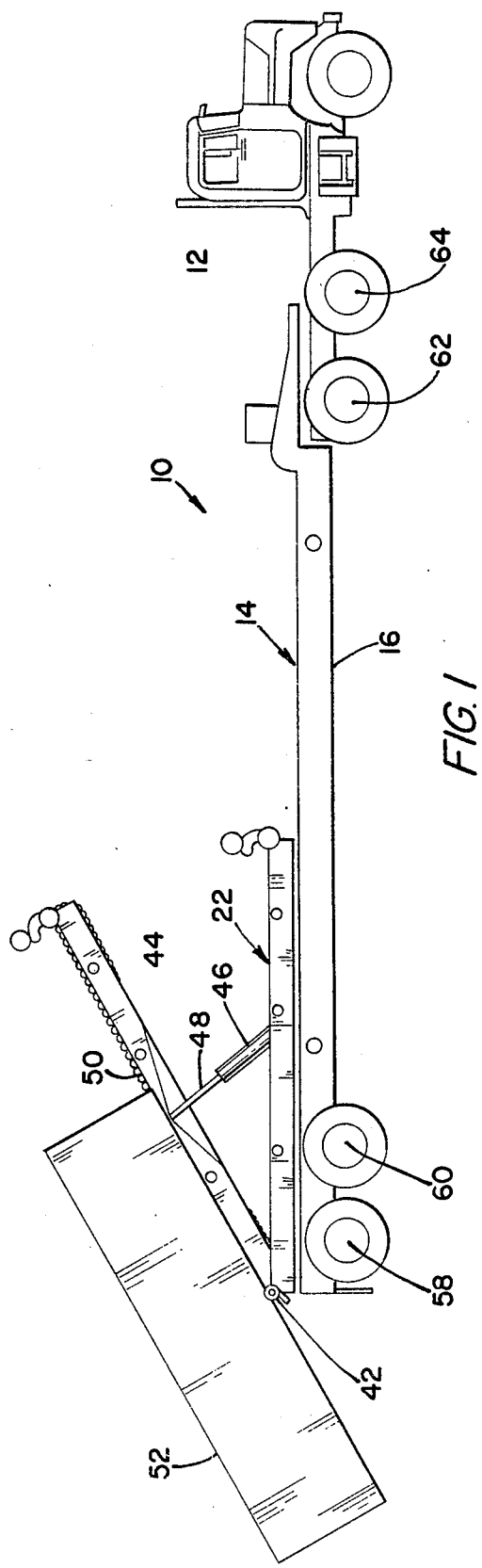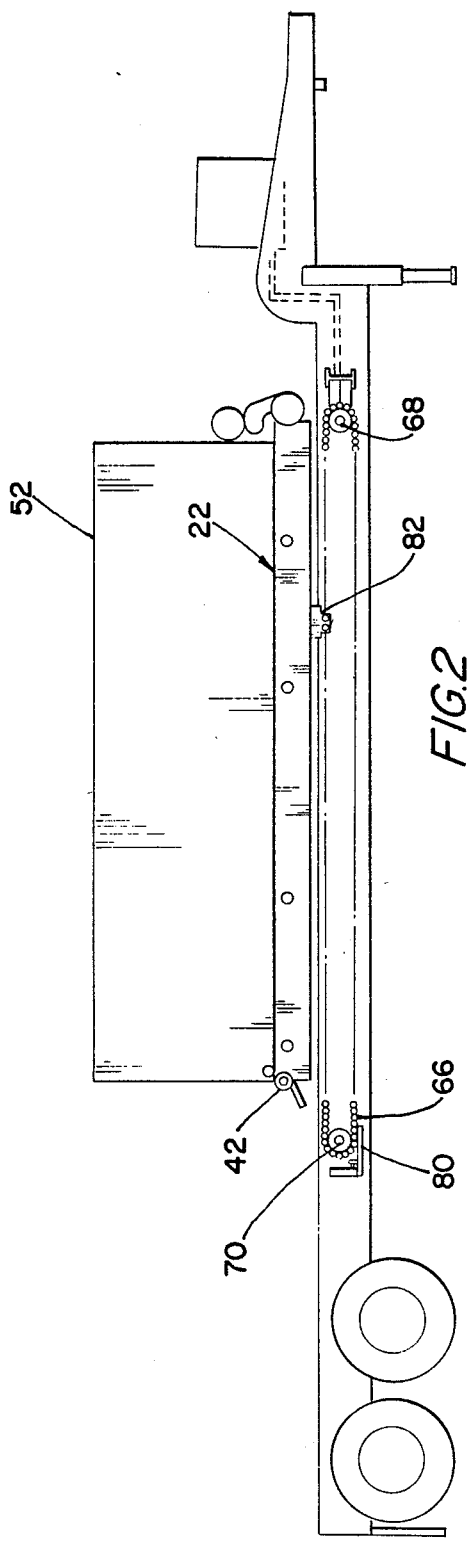

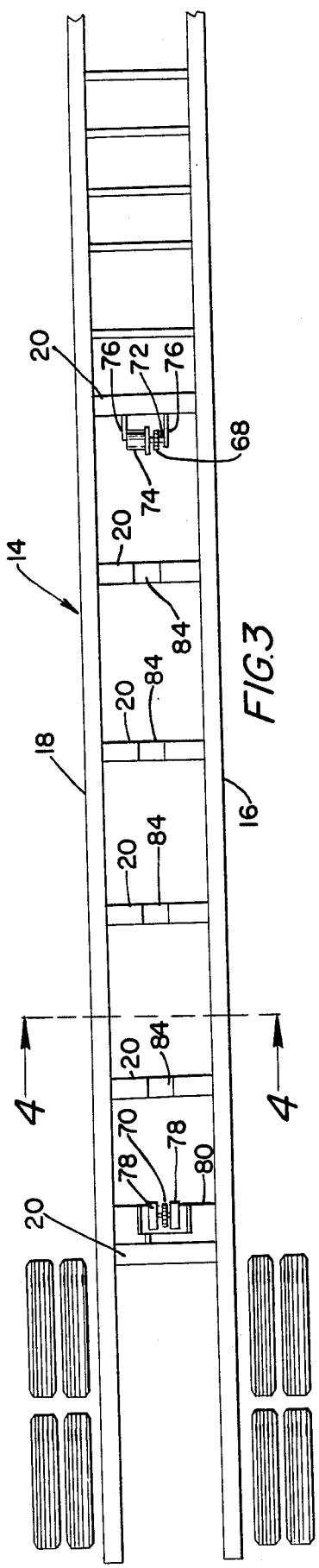
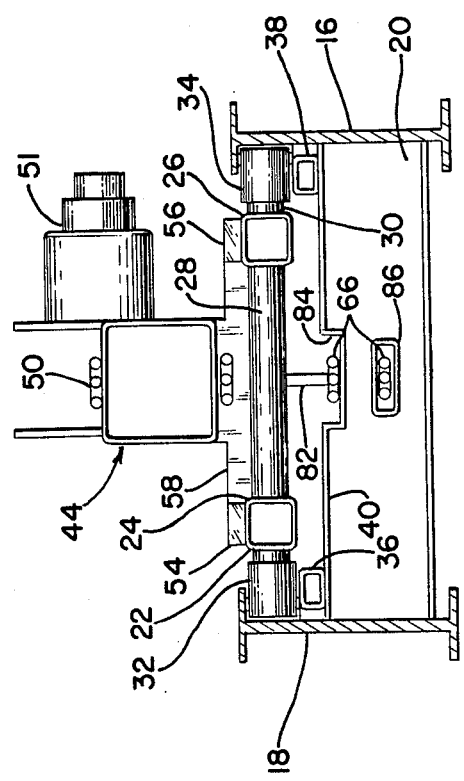

4,889,464

MOVABLE TIPPING FRAME FOR HOIST TRUCKS

BACKGROUND OF THE INVENTION

This invention relates to hoist vehicles having apparatus for increasing the payload while limiting the load bearing on each axle, and more particularly to hoist vehicles having a tipping or tilting frame on to which a payload container or the like may be pulled, carried and pushed off and having means for moving the frame longitudinally to optimize the position of the load relative to the axles of the truck.

Solid waste, for example, is collected in containers which when full are loaded onto a truck such as a semi-trailer and taken to a landfill where the container is emptied and returned by the truck to a waste collection point. A frame, called a tipping or tilting frame, is installed on the chassis of such a truck to facilitate the loading and unloading thereof. Conventionally, cables are utilized to pull the container onto the tilted tipping frame which is then lowered to its substantially horizontal position on the chassis, the frame being tilted by hydraulic cylinders. In U.S. application Ser. No. 921,597 filed Oct. 21, 1986, now U.S. Pat. No. 4,737,063, issued Apr. 12, 1988, a tilting frame having a chain hoist system is utilized instead of a cable so as to afford more mechanical control over the load and also facilitate unloading by pushing the container from the frame. Most states limit the over-the-road weight of trucks to 80,000 pounds for semi-trailers, however in the typical load configuration the maximum weight is reduced somewhat since the tipping or tilting frame has a pivot point near the rear of the truck bed. This placement of the frame results in the center of gravity of the load being located toward the rear of the bed to thereby place most of the weight of the load on the rear axle. However, the maximum weight bearing on the axles is limited by Federal Bridge Law to approximately 35,000 pounds on a tandem axle truck. In actual practice in order to ensure compliance with the limitation on the axle bearing weight, typical tipping frame hoist trucks have limited the weight bearing on each axle to less than 30,000 pounds taking into account the weight of the hoist system. Consequently, the maximum payload carried by such trucks is substantially less than that permitted.

Although there are suggestions in the prior art for longitudinally moving the frame of a truck, no prior art is known which attempts to optimize the location of the load relative to the axles but merely permit the load to be moved between two positions, i.e., between a transport position, and a loading/unloading position. These mechanisms typically employ telescoping hydraulic cylinders to move the frame and are generally intended for application when neither the total truck weight nor axle bearing weight is a significant consideration. Thus, the prior art mechanisms are not directed toward allowing longitudinal adjustment of the frame in order to optimize the load bearing on the axles. For example, in Corompt U.S. Pat. No. 4,755,097 it is recognized that the location of the center of gravity of the load affects the weight on the axles, but no provision is made to allow for adjustment of the center of gravity except to the one fixed position where the frame is located during transport. The pivot point during loading operations is changed in order to increase the ability to lift the load onto the truck bed while at the same time moving some of the weight off the rear axle during transport. In Lisota U.S. Pat. No. 2,621,814 a sliding bed is mounted on a tilting frame or the like for aiding in loading and unloading operations. Marlett U.S. Pat. No. 4,702,662 is somewhat similar to Lisota in this regard. In Derain U.S. Pat. No. 4,009,791 an L-shaped pivot member is mounted on the tipping frame and may be moved between forward and rearward positions on the tipping frame.

Since the load within a container or the like may not be equally distributed along the length of the container, and the lengths of containers may vary somewhat, it is important to adjust the transport position of the frame to where the weight bearing on the axles of the truck is optimized for each load transported. As aforesaid, the prior art has not proposed such a construction or attempted to offer a satisfactory solution to this problem.

SUMMARY OF THE INVENTION

Consequently, it is a primary object of the present invention to provide a vehicle having a bed including a pivotable tipping or tilting frame mounted for slidable movement in the direction of elongation of the bed for optimizing the position of a load carried by the tipping frame relative to the vehicle wheel axles so as to increase the payload carried by the vehicle while complying with mandated axle loading requirements.

It is another object of the present invention to provide a vehicle having a tipping or tilting frame for hoisting a container thereon and transporting the container over a roadbed for depositing at a remote location, the tipping frame being mounted for permitting the load to be adjustably positioned relative to the bed and thus the wheel axles of the vehicle.

It is a further object of the present invention to provide a vehicle having a tipping or tilting frame pivotably mounted on a slide frame, the slide frame being mounted in the bed of the vehicle for movement in the front to rear direction relative to the vehicle and driven in a manner permitting the tilting frame and the load carried thereon to be precisely located so that the load on the axles of the vehicle may be optimized.

Accordingly, the present invention provides a hoist vehicle such as a semi-trailer having a slide frame on which a tipping frame is pivotably mounted, the slide frame being adjustably movable from forward to rearward positions relative to the vehicle to locate the load carried by the tipping frame at positions where the load bearing on the axles of the vehicle is optimized so that greater payloads may be carried while still complying with governmentally mandated maximum loadings.

In carrying out the invention, a simple chain drive is utilized, the chain being trained about sprockets and connected to the slide frame for permitting adjustment of the center of gravity along the longitudinal axis of the truck bed thereby to spread the weight over the axles, including the additional axles of a semi-trailer. The chain drive arrangement permits accurate adjustment to the center of gravity of the load to optimize the loading on the vehicle axles so as to increase the payload that may be transported, and does so without adding materially to the weight of the vehicle which would have a negative effect on the load which could be transported.

BRIEF DESCRIPTION OF THE DRAWINGS

The particular features and advantages of the invention as well as other objects will become apparent from the following description taken in connection with the accompanying drawings, in which:

FIG. 1 is a side elevational view of a semi-trailer vehicle having a bed incorporating structure constructed in accordance with the principles of the present invention, the load being disposed in the rearmost position with the tipping frame tilted for loading or discharging of a container;

FIG. 2 is an elevational view of the semi-trailer bed illustrating the load carrying frame in a forward transporting position;

FIG. 3 is a fragmentary top plan view of a portion of the semi-trailer bed with the slide frame removed for purposes of clarity; and FIG. 4 is a cross-sectional view taken substantially along line 4—4 of FIG. 3.

DESCRIPTION OF THE PREFERRED EMBODIMENT

Referring now to the drawings, apparatus constructed in accordance with the principles of the present invention is illustrated in FIG. 1 in conjunction with a semi-trailer 10 which is conventionally connected by fifth wheel means to a truck 12 for conventionally driving the trailer. The trailer 10 includes a bed 14 having a pair of spaced apart elongated rails in the form of I-beams 16, 18 interconnected at spaced locations by a plurality of transversely extending plates 20, the rails and plates preferably being constructed from steel or similar high strength rigid material.

In accordance with the present invention a slide frame 22 is slidably mounted in the bed 14. The slide frame 22, as best illustrated in FIG. 4, comprises a pair of longitudinally elongated rails 24, 26, preferably formed from tubular steel and connected together by spaced apart cross members 28 which may be heavy wall steel pipe. Disposed within each cross member 28 is a shaft 30. The shaft extends outwardly of the ends of the cross members and journally carries a cylindrical roller 32, 34 at the respective ends thereof. The rollers 32, 34 are respectively supported on wear bars 36, 38 preferably in the form of tubular steel box members or the like which function as trucks for the rollers and are securely supported on the upper walls 40 of a plurality of the cross members 20 intermediate the ends of the bed 14. Thus, the slide frame 22 may slidably translate relative to the bed 14 of the trailer in the direction of elongation thereof.

Pivotably mounted at the rear end of the slide frame 22 by journal means including a pivot shaft 42 is a tipping frame 44, the tipping frame forming the subject matter of patent application Ser. No. 921,597 filed Oct. 21, 1986 and assigned to the common assignee of the present invention. The tipping frame 44 as disclosed in the aforesaid patent application is pivotally driven about the pivot shaft 42 by one or more hydraulic cylinders 46, the housing of which is pivotally carried by the slide frame 22 with the extendible piston 48 pivotally connected to the tipping frame. The cylinders are powered by hydraulic fluid from pump means located in the bed 14 or carried by the truck 12. The tipping frame includes an endless chain 50 arranged to run around a motor driven sprocket and reducing means 51 as disclosed in the aforesaid patent application at one end thereof, the motor preferably being a hydraulic motor, and an idler sprocket. The chain 50 has a tail connected to the chain and to a hook for grasping a container 52 or the like which carries the payload therein. The container 52 may be loaded or unloaded from the tipping frame 44 by driving the chain 50 in a selected one of two directions as required after the tipping frame has been tilted by extension of the piston 48 from the hydraulic cylinder 46, as illustrated in FIG. 1. When the container has been loaded onto the tipping frame 44 the tipping frame may then be pivoted back from the inclined position to a substantially horizontal position onto the slide frame 22. Spacer members 54, 56 disposed on transversely projecting arms 58 extending from the tipping frame 44 are supported on the upper surfaces of the slide frame rails 24, 26 respectively when the tipping frame is in the horizontal position so that the tipping frame is supported on and may be secured to the slide frame with the container 52 thereon.

In order to drive the slide frame 22 longitudinally relative to the bed 14 so as to position the center of gravity of the load optimally relative to the axles 58, 60 of the trailer 10 and at least the axles 62, 64 of the truck 12, an endless chain 66 having a plurality of articulated links is disposed within the bed and trained about a pair of sprockets 68, 70. The sprocket 68, which is the drive sprocket, is fastened on a shaft 72 of a rotary hydraulic motor 74, the assembly being supported by brackets 76 secured to one of the cross members 20 preferably adjacent the forward end of the bed 14 for rigidly mounting the motor 74 and journally mounting the motor shaft. The motor 74 may be powered with hydraulic fluid by the same hydraulic pump means which supplies the hydraulic fluid to the cylinders 46. The sprocket 70 is an idler sprocket and is mounted on a shaft carried intermediate a pair of bearing blocks 78 mounted on a shelf 80 secured to a cross member 20 adjacent the rear of the bed. A connecting and tensioning bracket 82 is fastened to one or more links of the chain 66 by means of the pins associated therewith and is secured to one of the cross members 28 of the slide frame 22.

In order to provide clearance for the chain and bracket 82, the cross member plates 20 intermediate the transverse extremities thereof are formed with a trough 84 of sufficient width, the trough merely being a recess cut in the upper walls 40 of the plates. Additionally, to permit the chain to move freely between the cross member plates 20 of the bed 14, the plates intermediate the sprockets 68, 70 each have a cut-out formed beneath the trough 84 and a channel guide 86 in the form of tubing is inserted and secured therein, the guide channels either being separate tube members within each cross member as illustrated, or may be a single elongated tube extending between the bed cross member 20 and secured in the respective cut-outs.

Accordingly, by means of a simply driven slide frame, the invention permits the load to be adjustably positioned backward and forward to the point where the weight of the load bearing on the axles of the trailer and truck is optimized for meeting the requirements of Federal Bridge Law while permitting a maximizing of the amount of weight carried by the trailer in compliance with the local legal weight limit for over-the-road semi-trailer trucks. By controlling the hydraulic motor 74, the chain 66 may be positioned in fine increments to the optimum position for the center of gravity of the load being transported.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A hoist vehicle having an elongated bed including a front end and a rear end with axle-mounted wheels, said bed comprising laterally spaced apart side rails interconnected together by longitudinally spaced apart cross members, track means disposed on said cross members extending longitudinally in said bed at laterally spaced dispositions, a slide frame including laterally spaced apart longitudinally extending beam members interconnected together by longitudinally spaced apart cross beams, roller means journally carried at the lateral extremities of said cross beams for rotatably riding on said track means for permitting movement of said slide frame between longitudinal dispositions, a tipping frame pivotably mounted on said slide frame adjacent the rear end thereof, lift means for pivotably raising and lowering said tipping frame relative to said slide frame selectively between a position wherein said tipping frame is supported on said slide frame and inclined positions relative to said slide frame, load moving means on said tipping frame for securely moving a container along said tipping frame for loading and unloading thereof when said tipping frame for loading and unloading thereof when said tipping frame is inclined, a pair of longitudinally spaced apart sprockets rotatably carried in said bed for rotation about laterally extending axes, an endless chain trained about said sprockets so as to have upper and lower longitudinally extending runs, bracket means fastened to said chain and to at least one of said cross beams, and drive means for driving said chain and thereby said slide frame longitudinally selectively to position said tipping frame and container at selective positions relative to said bed in order to optimize the load over the axles.

2. A hoist vehicle as recited in claim 1, wherein each cross member intermediate said sprockets includes a trough disposed in an upper surface thereof, guide channel means extending through said cross members beneath said troughs, said chain being disposed with the upper run positioned for movement through said troughs and the lower run positioned for movement through said channel means, and said bracket means being fastened to said upper run and disposed for movement through said troughs.

3. A hoist vehicle as recited in claim 1, wherein said drive means comprises a hydraulic motor drivingly connected to one of said sprockets.

4. A hoist vehicle as recited in claim 3, wherein said lift means comprises telescoping hydraulic cylinder means.

5. A hoist vehicle as recited in claim 3, wherein each cross member intermediate said sprockets includes a trough disposed in an upper surface thereof, guide channel means extending through said cross members beneath said troughs, said chain being disposed with the upper run positioned for movement through said troughs and the lower run positioned for movement through said channel means, and said bracket means being fastened to said upper run and disposed for movement through said troughs.

6. A hoist vehicle as recited in claim 5, wherein said lift means comprises telescoping hydraulic cylinder means.

7. A hoist vehicle as recited in claim 6, wherein said load moving means includes an endless chain for pulling said container onto and off of said tipping frame.

* * * * *